United States Patent
Parihar et al.

(10) Patent No.: US 11,777,562 B2
(45) Date of Patent: Oct. 3, 2023

(54) VERTICAL BEAMWIDTH ADJUSTMENT TO INCREASE MU-MIMO PAIRING EFFICIENCY

(71) Applicant: T-Mobile Innovations LLC, Overland Park, KS (US)

(72) Inventors: Vanil Parihar, Prosper, TX (US); Sreekar Marupaduga, Overland Park, KS (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/518,251

(22) Filed: Nov. 3, 2021

(65) Prior Publication Data
US 2023/0137792 A1    May 4, 2023

(51) Int. Cl.
*H04L 1/02*     (2006.01)
*H04B 7/0452*   (2017.01)
*H04B 7/0456*   (2017.01)

(52) U.S. Cl.
CPC .......... *H04B 7/0452* (2013.01); *H04B 7/046* (2013.01)

(58) Field of Classification Search
CPC .. H04B 7/04048; H04B 7/0695; H04B 7/088; H04B 7/0602; H04B 7/0491; H04B 7/0617; H04B 24/02; H04B 17/12; H04W 16/10; H04W 16/28; H04W 88/02; H04L 7/0452
USPC ........................................ 375/267, 260, 262
See application file for complete search history.

(56) References Cited

U.S. PATENT DOCUMENTS

| 10,075,928 | B2* | 9/2018 | Islam | H04L 5/0048 |
| 10,116,373 | B1* | 10/2018 | Marupaduga | H04B 7/0617 |
| 10,411,781 | B1* | 9/2019 | Marupaduga | H04B 17/12 |
| 2015/0365939 | A1* | 12/2015 | Zhang | H04L 5/0037 370/336 |
| 2017/0223638 | A1* | 8/2017 | Lopes | H04L 5/0062 |
| 2021/0297129 | A1* | 9/2021 | Da Silva | H04L 5/0023 |

* cited by examiner

Primary Examiner — Khai Tran
(74) Attorney, Agent, or Firm — Shook, Hardy & Bacon L.L.P.

(57) ABSTRACT

Systems and methods are provided for dynamically modifying beamforming weights based on MU-MIMO user device pairings. A quantity of MU-MIMO user device pairings served by a node is determined. Based on a maximum quantity of potential MU-MIMO user device pairings for the node, it is determined that a quantity of the MU-MIMO user device pairings for the node is below a threshold. Because the quantity of the MU-MIMO user device pairings is below the threshold, beamforming weights are modified to widen a vertical main lobe to increase the quantity of MU-MIMO user device pairings.

17 Claims, 5 Drawing Sheets

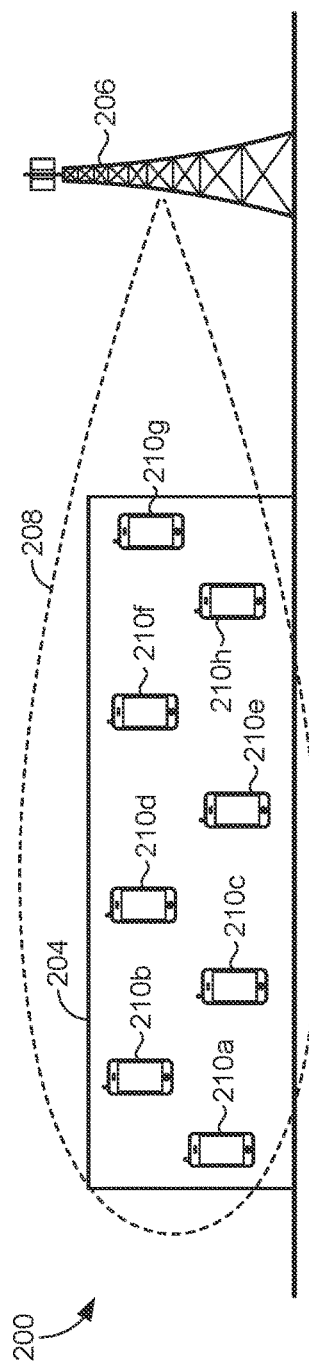
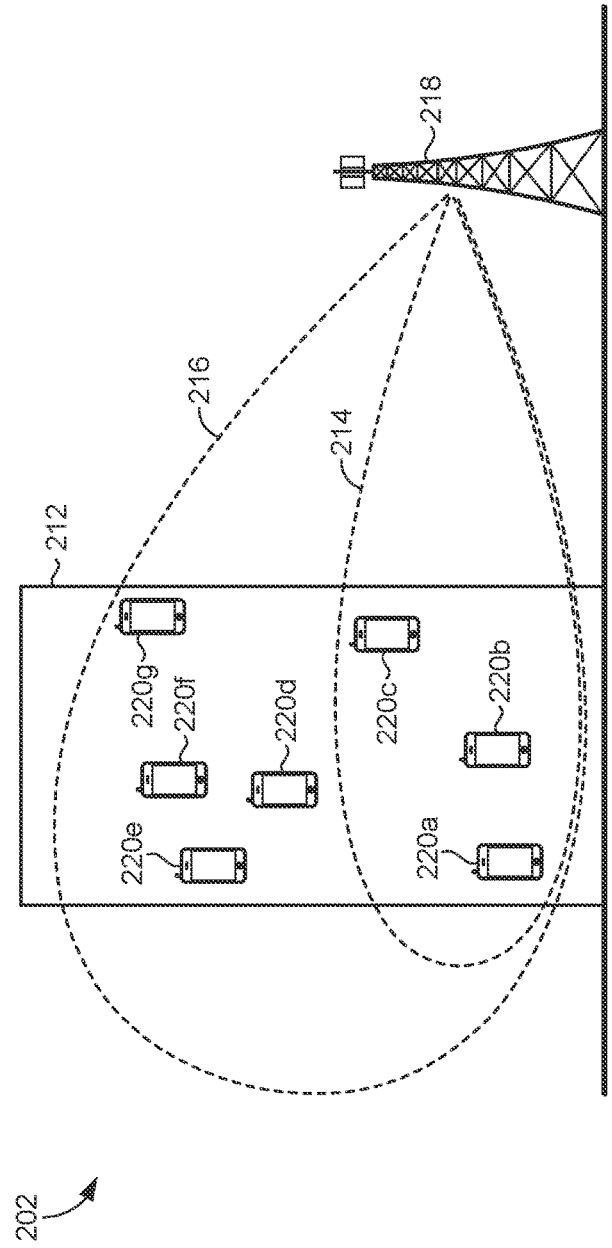
FIG. 2A
FIG. 2B

VERTICAL BEAMWIDTH ADJUSTMENT TO INCREASE MU-MIMO PAIRING EFFICIENCY

SUMMARY

The present disclosure is directed, in part, to widening a vertical width of a beam to increase MU-MIMO pairing efficiency at a node. A quantity of MU-MIMO user device pairings within the coverage area of a particular beam is monitored, and compared to a total quantity of potential MU-MIMO user device pairings at that node, or within that beam. A pairing efficiency may also be computed. When the quantity of MU-MIMO user device pairings or the pairing efficiency is below a threshold, beamforming weights of the beam may be modified to increase the vertical width, thus increasing the quantity of MU-MIMO user device pairings covered by the beam, which results in an increased pairing efficiency.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein:

FIGS. 2A and 2B depict diagrams of increasing a vertical beamwidth according to various aspects herein;

DETAILED DESCRIPTION

Figure 1:
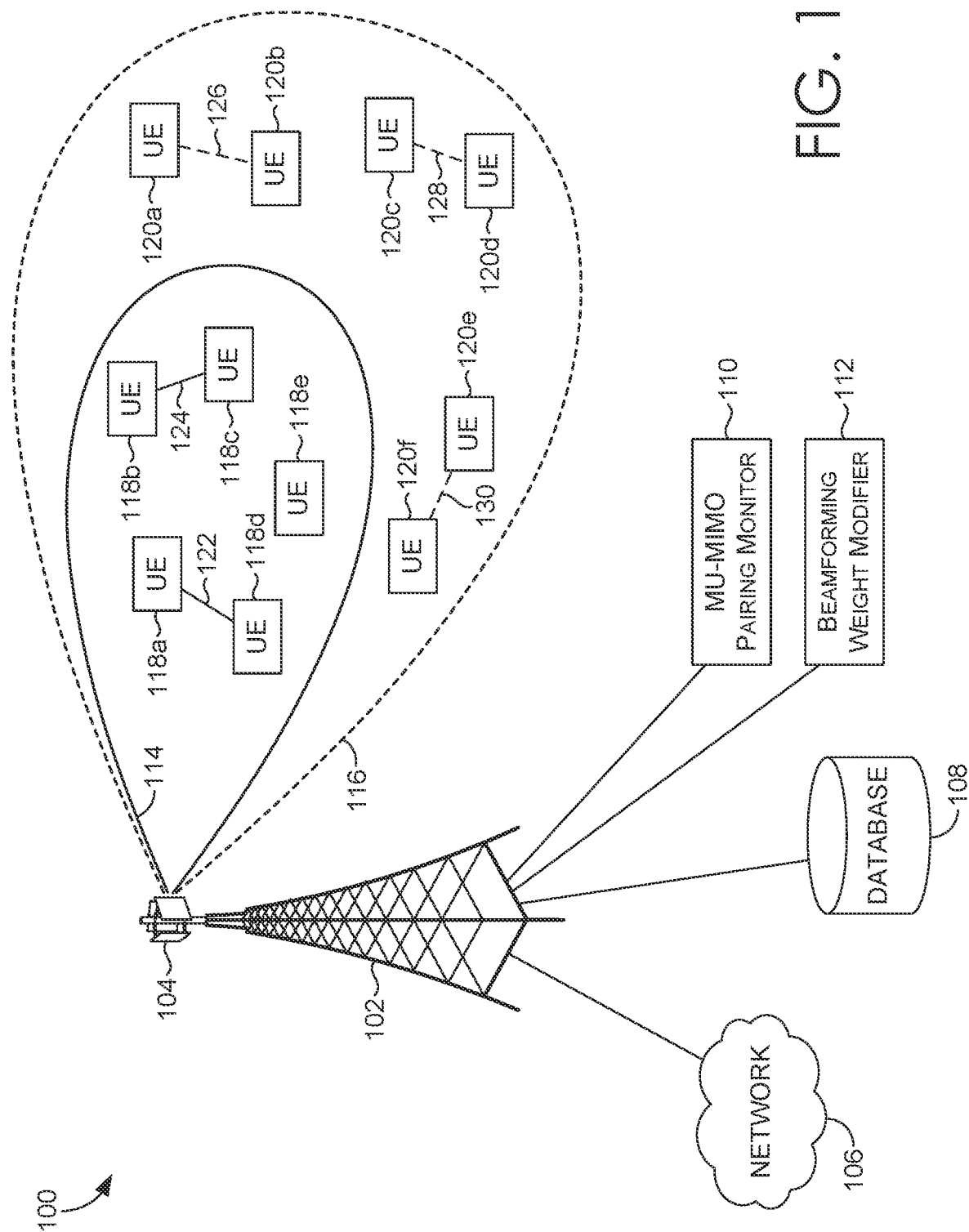
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, beamforming is commonly used by telecommunications carriers for many reasons. Some of those reasons include the ability to reach select user devices (e.g., user devices at the cell edge), and to provide better speeds to user devices. In aspects, an antenna array associated with a node may be configured for beamforming, wherein one or more downlink signals can be transmitted in beams having different beam profiles. As used herein, a beam profile or a radiation pattern may be associated with a particular signal, set of signals, antenna, or set of antennas, and may be said to have a vertical beamwidth and a horizontal beamwidth; the horizontal beamwidth is the angular width (i.e., azimuth) of a beam and the vertical beamwidth is the angular height of the beam. For example, traditional macro cells may have an approximately a 120 degree horizontal beamwidth (i.e., a downlink signal is transmitted to user devices in ⅓ of the horizontal plane centered on the antenna) and a 15 degree vertical beamwidth. In aspects, a vertical beamwidth may be fixed (e.g., in a range of 7-15 degrees) or dynamic (e.g., using beamforming techniques, the vertical beamwidth may change in response to network conditions or UE demand).

Multiple User Multiple Input Multiple Output (MU-MIMO) is a technique where the same physical air interface resources are used by multiple users in an uplink or downlink connection with a base station. Traditionally, the base station establishes uplink (or downlink) transmission with a mobile handset over a single frequency that is exclusive to that particular uplink connection (e.g., an LTE connection with an EnodeB, or 5G connection with a GnodeB). In this regard, typically only one active uplink connection can occur per frequency. MU-MIMO allows multiple users to be paired for uplink over the same frequency, allowing transfer of data over the same physical air resources. This increases efficiency of use of existing resources, at the cost of more expensive or intricate signal processing.

In aspects herein, a pairing efficiency, such as a quantity of MU-MIMO pairings compared to a total number of potential MU-MIMO pairings in a particular sector, is analyzed to determine whether a beam should be widened by adjusting the phase and amplitude of that beam. More specifically, in some situations, such as when multiple user devices are distributed within a building, it may be beneficial to widen a vertical beam width to cover more users in that building. This may occur when, for instance, the building is a high-rise building or otherwise taller building with multiple stories. In this scenario, a wider beam is beneficial as it is able to capture more of the user devices within its coverage area. In aspects herein, when the pairing efficiency is lower than a predetermined threshold, a determination is made to widen the beam to increase the pairing efficiency in that particular sector.

A first aspect of the present disclosure is directed to a system for dynamically modifying beamforming weights based on MU-MIMO user device pairings. The system includes a processor and one or more computer storage hardware devices storing computer-usable instructions that, when used by the processor, cause the processor to perform various steps. The processor is caused to determine a quantity of MU-MIMO user device pairings served by a node, based on a maximum quantity of potential MU-MIMO user device pairings for the node, determine that a quantity of the MU-MIMO user device pairings for the node is below a threshold, and based on the quantity of the MU-MIMO user device pairings being below the threshold, modify one or more beamforming weights to widen a vertical main lobe.

A second aspect of the present disclosure is directed to a method for dynamically modifying beamforming weights based on MU-MIMO user device pairings. The method includes determining a quantity of MU-MIMO user device pairings served by a node, and based on a maximum quantity of potential MU-MIMO user device pairings at the node, determining a threshold for MU-MIMO user device pairings for the node. Further, the method includes determining that the quantity of MU-MIMO user device pairings at the node is below the threshold, and modifying one or more beamforming weights to widen a vertical main lobe.

According to another aspect of the technology described herein, a method is provided for dynamically modifying beamforming weights based on MU-MIMO user device pairings. The method includes computing a MU-MIMO pairing efficiency for a node, determining that the MU-MIMO pairing efficiency is below a threshold, and based on the MU-MIMO pairing efficiency being below the threshold, modifying one or more beamforming weights to widen a vertical main lobe formed from MU-MIMO at the node.

FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes node 102, an antenna array 104, wireless communications network 106, database 108, MU-MIMO pairing monitor 110, beamforming weight modifier 112, a first beam 114, and a second beam 116. In network environment 100, user devices 118a-118e and 120a-120f may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with node 102 in order to interact with a public or private network.

Figure 5:
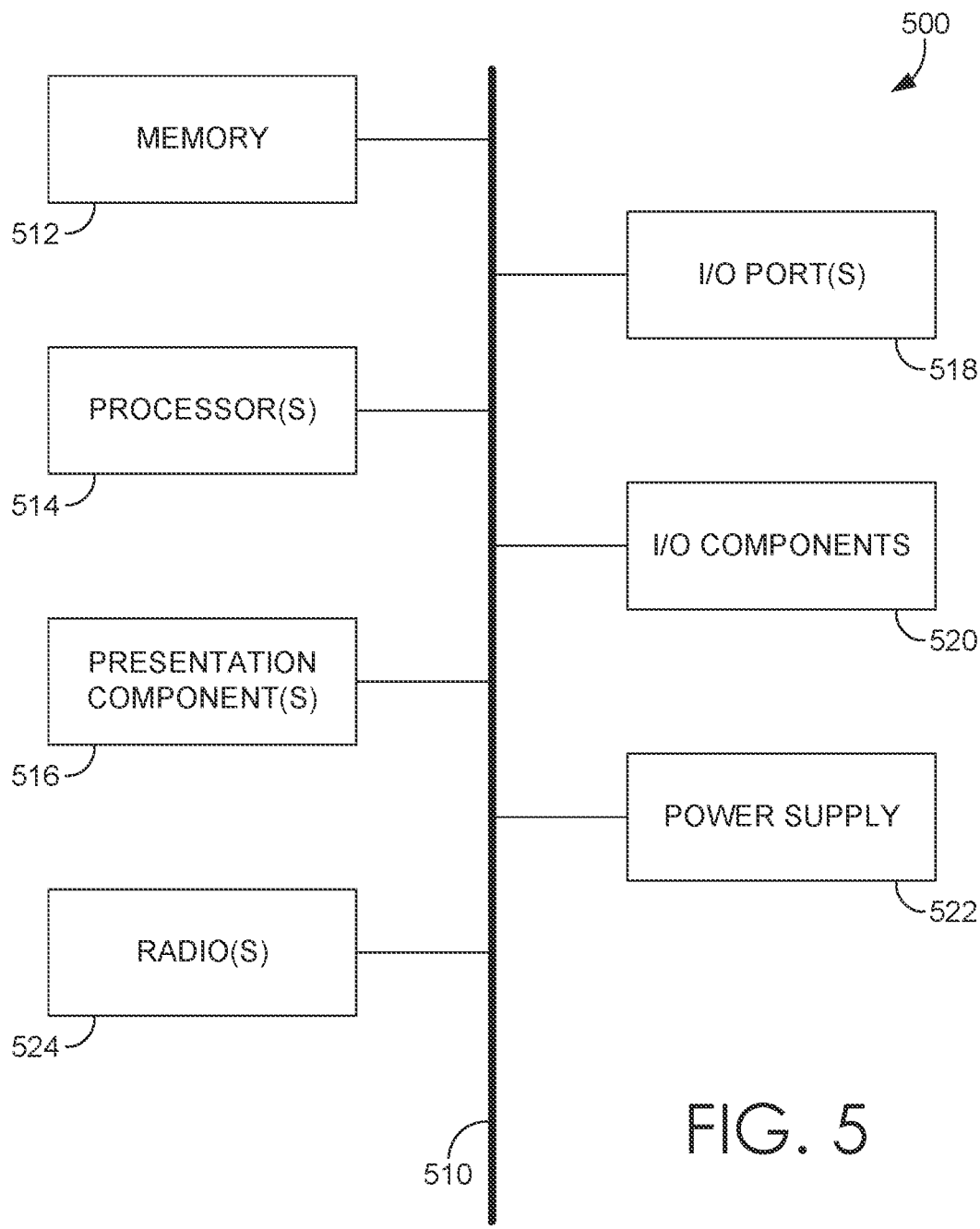
FIG. 5 depicts an exemplary computing environment suitable for use in implementations of the present disclosure.

In some aspects, the user devices 118a-118e and 120a-120f may correspond to computing device 500 in FIG. 5. Thus, a user device can include, for example, a display(s), a power source(s) (e.g., a battery), a data store(s), a speaker(s), memory, a buffer(s), a radio(s) and the like. In some implementations, a user device (such as user devices 118-138) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G NR, LTE, CDMA, 6G, or any other type of network.

In some cases, user devices 118a-118e and 120a-120f in network environment 100 can optionally utilize a network 106 to communicate with other computing devices (e.g., a mobile device(s), a server(s), a personal computer(s), etc.) through node 102. Network 106 may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network 106 can be part of a telecommunication network that connects subscribers to their immediate service provider. In some instances, the network 106 can be associated with a telecommunications provider that provides services (e.g., voice, data, SMS) to user devices, such as user devices user devices 118a-118e and 120a-120f. For example, the network 106 may provide voice and non-voice services, including SMS, and/or data services to user devices or corresponding users that are registered or subscribed to utilize the services provided by a telecommunications provider. The network 106 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), a 5G NR network or a 6G network.

In some implementations, node 102 is configured to communicate with user devices, such as user devices 118a-118e and 120a-120f and other devices that are located within the geographical area, or cell, covered by the one or more antennas of node 102. Node 102 may include one or more base stations, nodes, base transmitter stations, radios, antennas, antenna arrays, power amplifiers, transmitters/receivers, digital signal processors, control electronics, GPS equipment, and the like. In one aspect, node 102 is a gNodeB, while in another aspect, node 102 is an eNodeB. In particular, user devices 118a-118e and 120a-120f may communicate with node 102 according to any one or more of a variety of communication protocols, in order to access the network.

As shown in FIG. 1, user devices 118a-118e are served by the first beam 114 based on their geographic location, being within the coverage area of first beam 114. As shown, user devices 118a and 118d are part of a MU-MIMO pairing 122, and user devices 118b and 118c are also part of a MU-MIMO pairing 124. User device 118e is not part of a MU-MIMO pairing. User devices 120a-120f, in one aspect, could be located outside of the current coverage area of first beam 114. In one aspect, the pairing efficiency within the first beam 114 is monitored. When it is determined to be below a predetermined threshold, the phase and amplitude of first beam 114 may be modified in an attempt to increase the pairing efficiency. For instance, the pairing efficiency within first beam 114 may be computed by dividing the current number of pairings by a total number of potential pairings. So, here, the number of pairings is two. If the total number of potential pairings is eight, the pairing efficiency is computed to be $2/8$, or 25%. If 25% is below the predetermined threshold, it may be determined to adjust the phase and/or amplitude of the beam to increase the pairing efficiency. The total number of potential pairings is dependent upon carrier's specific MIMO implementation.

As mentioned, one way to increase the pairing efficiency is to adjust the phase and/or amplitude to widen the beam. As shown in FIG. 1, first beam 114 may be widened to include more user devices in its coverage area, as shown by second beam 116. In one aspect, when multiple user devices are vertically spaced apart, such as in a tall building or stadium, the vertical beam width may be increased to provide better coverage for these user devices. As such, as shown in FIG. 1, second beam 116 includes user devices 118a-118e and 120a-120f. Three MU-MIMO pairings, 126, 128, and 130 have been made and cause the pairing efficiency to increase. Instead of a pairing efficiency of 25%, the pairing efficiency increases here to $5/8$, or around 62.5%.

Network environment 100 also includes MU-MIMO pairing monitor 110, which is generally responsible for monitoring MU-MIMO pairings within a particular sector, or within a particular beam, such as first beam 114 or second beam 116. MU-MIMO pairing monitor 110 may be integral to or associated with node 102. Alternatively, in some aspects, MU-MIMO pairing monitor 110 is not associated with node 102 and instead communicates with node 102 to receive pairing information. MU-MIMO pairing monitor 110 may also be responsible for computing the pairing efficiency and determining whether it is below or above the predetermined threshold.

When the pairing efficiency is below the predetermined threshold, beamforming weight modifier 112 may be instructed to modify one or more of the phase or amplitude of the beam to vertically widen the beam to increase the pairing efficiency. Beamforming weight modifier 112 may be integral to or associated with node 102, as antenna array 104 is the component that forms the beams.

FIGS. 2A and 2B depict diagrams of increasing a vertical beamwidth according to various aspects herein. Initially, FIG. 2A illustrates node 206 having beam 208 whose coverage area includes the user devices 210a-210h within building 204. As shown here, there is no need for increasing a vertical beamwidth of beam 208, as all or most of the user devices within building 208 are covered. FIG. 2B illustrates node 208 with beam 214 whose coverage area includes user devices 220a-220c. While three user devices are illustrated within beam 214, other quantities of user devices are contemplated to be within the coverage area of beam 214. Additionally, while no MU-MIMO pairings are illustrated for the sake of simplicity, pairing efficiency will be discussed within the discussion of FIG. 2B. As such, within beam 214, there are one or more MU-MIMO pairings and the pairing efficiency is lower than a predetermined threshold. As such, it is determined that the vertical beamwidth is to be increased to accommodate and cover user devices that are vertically geographically separated from user devices 220a-220c.

Continuing with the aspect of FIG. 2B, once it has been determined to increase the vertical beam width of beam 214, a beam such as beam 216 may be produced by modifying the phase and/or amplitude of beam 214. As shown within beam 216, user devices 220d-220g are now included within the coverage area of beam 216, in addition to user devices 220a-220c. There are one or more additional MU-MIMO pairings of user devices 220d-220g, thus increasing the pairing efficiency within the beam.

Figure 3:
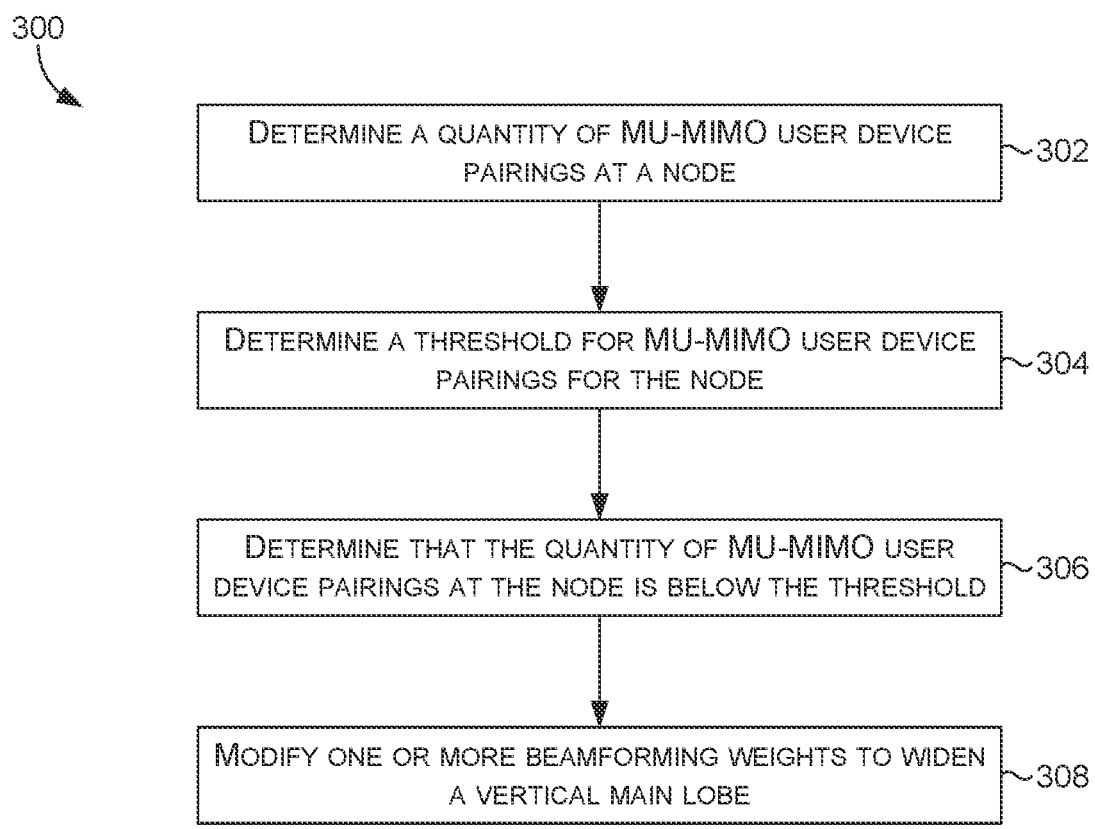
FIGS. 3-4 depict flow diagrams of exemplary methods for dynamically modifying beamforming weights based on MU-MIMO user device pairings, in accordance with aspects herein.

FIG. 3 depicts a flow diagram of an exemplary method for dynamically modifying beamforming weights based on MU-MIMO user device pairings, in accordance with aspects herein. At block 302, a quantity of MU-MIMO user device pairings at a node is determined. In a particular aspect, this quantity of pairings is determined in a particular beam produced by an antenna array at the node. In some aspects, the node (e.g., eNodeB, gNodeB) has this pairing information. The pairing information may be requested from the node. At block 304, a threshold for MU-MIMO user device pairings for the node is determined. In some aspects, the threshold for MU-MIMO user device pairings is a pairing efficiency, which is based on a quantity of current pairings and a total quantity of potential pairings, where the quantity of potential pairings is based on, for example, the particular antenna array/subarrays utilized at the node, such as a size of the antenna array/subarray.

At block 306, it is determined that a quantity of MU-MIMO user device pairings at the node is below the threshold. At block 308, one or more beamforming weights (e.g., phase and/or amplitude) are modified to widen a vertical width of the main lobe. In aspects, widening the width of the main lobe may cause the quantity of pairings to increase, thus exceeding the threshold. Further, increasing the quantity of pairings also causes the pairing efficiency to increase, as there are more pairings when compared to the quantity of potential pairings. In one aspect, the quantity of MU-MIMO pairings or the pairing efficiency at a node may be continuously monitored such that if the vertical beam width can be narrowed without adversely affecting the quantity of pairings or the pairing efficiency, the beamforming weights may be modified to narrow the vertical beam width.

Figure 4:
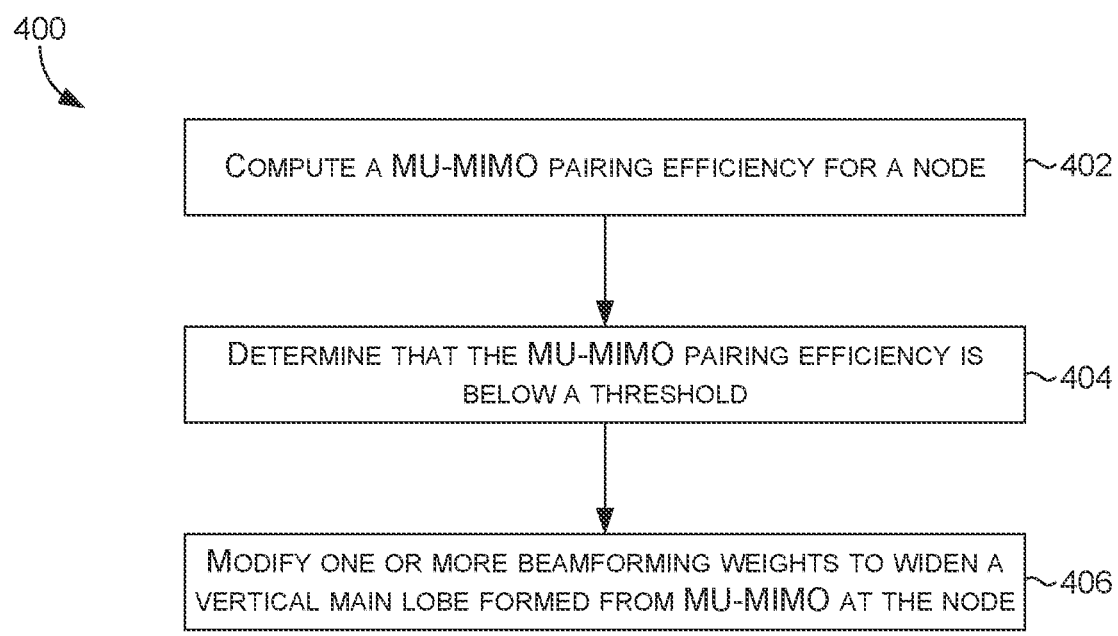

FIG. 4 depicts a flow diagram of an exemplary method for dynamically modifying beamforming weights based on MU-MIMO user device pairings, in accordance with aspects herein. At block 402, a MU-MIMO pairing efficiency for a node is computed. As discussed, the pairing efficiency is computed by comparing the current quantity of MU-MIMO pairings to a total quantity of potential MU-MIMO pairings at a particular node, or for a particular beam. For instance, computing the pairing efficiency may comprise determining a quantity of MU-MIMO pairings at the node, and based on a maximum quantity of potential MU-MIMO user device pairings at the node and the quantity of MU-MIMO user device pairings, determining the pairing efficiency. At block 404, it is determined that the pairing efficiency is below a threshold. Based on this, at block 406, one or more beamforming weights are modified to widen a vertical main lobe formed from MU-MIMO beamforming at the node.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically modifying beamforming weights based on MU-MIMO user device pairings, the system comprising:
   a processor; and
   one or more computer storage hardware devices storing computer-usable instructions that, when used by the processor, cause the processor to:
   determine a quantity of MU-MIMO user device pairings served by a node;
   based on a maximum quantity of potential MU-MIMO user device pairings for the node, determine that a quantity of the MU-MIMO user device pairings for the node is below a threshold; and
   based on the quantity of the MU-MIMO user device pairings being below the threshold, modify one or more beamforming weights to widen a vertical main lobe.

2. The system of claim 1, wherein the processor is further caused to request the quantity of MU-MIMO user device pairings served by the node from a gNodeB associated with the node.

3. The system of claim 1, wherein the beamforming weights correspond to at least a phase and an amplitude of a beam.

4. The system of claim 1, wherein the processor is further caused to compute a pairing efficiency based on the quantity of MU-MIMO user device pairings served by a node.

5. The system of claim 1, wherein the vertical main lobe is formed using MU-MIMO.

6. The system of claim 1, wherein the processor is further caused to, subsequent to the one or more beamforming weights being modified to widen the vertical main lobe, determine that the quantity of the MU-MIMO user device pairings for the node is above the threshold.

7. The system of claim 6, wherein the processor is further caused to modify the one or more beamforming weights to narrow the vertical main lobe.

8. A method for dynamically modifying beamforming weights based on MU-MIMO user device pairings, the method comprising:
   determining a quantity of MU-MIMO user device pairings served by a node;
   based on a maximum quantity of potential MU-MIMO user device pairings at the node, determining a threshold for MU-MIMO user device pairings for the node;
   determining that the quantity of MU-MIMO user device pairings at the node is below the threshold; and
   modifying one or more beamforming weights to widen a vertical main lobe.

9. The method of claim 8, wherein the vertical main lobe is formed using MU-MIMO.

10. The method of claim 8, further comprising subsequent to modifying the one or more beamforming weights to widen the vertical main lobe, determining that the quantity of the MU-MIMO user device pairings for the node is above the threshold.

11. The method of claim 10, further comprising modifying the one or more beamforming weights to narrow the vertical main lobe.

12. A method for dynamically modifying beamforming weights based on MU-MIMO user device pairings, the method comprising:
   computing a MU-MIMO pairing efficiency for a node;
   determining that the MU-MIMO pairing efficiency is below a threshold; and
   based on the MU-MIMO pairing efficiency being below the threshold, modifying one or more beamforming weights to widen a vertical main lobe formed from MU-MIMO at the node.

13. The method of claim 12, wherein computing the MU-MIMO pairing efficiency comprises:
   determining a quantity of MU-MIMO user device pairings at the node; and
   based on a maximum quantity of potential MU-MIMO user device pairings at the node and the quantity of MU-MIMO user device pairings at the node, determining the MU-MIMO pairing efficiency.

14. The method of claim 12, wherein the MU-MIMO pairing efficiency is based on a quantity of MU-MIMO user device pairings at the node and a maximum quantity of potential MU-MIMO user device pairings at the node.

15. The method of claim 12, wherein the one or more beamforming weights correspond to at least a phase and an amplitude of the vertical main lobe.

16. The method of claim 12, further comprising subsequent to modifying the one or more beamforming weights to widen the vertical main lobe, determining that the MU-MIMO pairing efficiency is above the threshold.

17. The method of claim 16, further comprising modifying the one or more beamforming weights to narrow the vertical main lobe.

* * * * *